(12) United States Patent
Schadler

(10) Patent No.: US 10,265,650 B2
(45) Date of Patent: Apr. 23, 2019

(54) FUEL FILTER

(71) Applicant: Mahle International GmbH, Stuttgart (DE)

(72) Inventor: Werner Schadler, Seggauberg (AT)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/559,826

(22) PCT Filed: Mar. 8, 2016

(86) PCT No.: PCT/EP2016/054890
§ 371 (c)(1),
(2) Date: Sep. 19, 2017

(87) PCT Pub. No.: WO2016/150694
PCT Pub. Date: Sep. 29, 2016

(65) Prior Publication Data
US 2018/0050292 A1    Feb. 22, 2018

(30) Foreign Application Priority Data

Mar. 20, 2015 (DE) .................. 10 2015 205 065

(51) Int. Cl.
*B01D 36/00* (2006.01)
*F02M 37/22* (2006.01)
*G01F 23/24* (2006.01)

(52) U.S. Cl.
CPC ......... *B01D 36/005* (2013.01); *F02M 37/221* (2013.01); *G01F 23/242* (2013.01)

(58) Field of Classification Search
CPC .... B01D 36/005; G01F 23/243; F02M 37/221
See application file for complete search history.

(56) References Cited

U.S. PATENT DOCUMENTS

| | | | |
|---|---|---|---|
| 5,138,881 A | 8/1992 | Riley et al. | |
| 5,256,574 A | 10/1993 | Neuburger et al. | |
| 5,546,005 A * | 8/1996 | Rauchwerger | G01F 23/266 324/664 |
| 7,571,716 B2 | 8/2009 | Tipton et al. | |
| 8,658,032 B2 | 2/2014 | Girondi | |

(Continued)

FOREIGN PATENT DOCUMENTS

| | | |
|---|---|---|
| DE | 102006005529 A1 | 8/2007 |
| DE | 102008001100 A1 | 10/2009 |

(Continued)

OTHER PUBLICATIONS

English abstract for DE-102006005529 Aug. 2007.

(Continued)

*Primary Examiner* — Terry K Cecil
(74) *Attorney, Agent, or Firm* — Fishman Stewart PLLC

(57) ABSTRACT

A fuel filter may include a housing and a filter element positioned within the housing. A water collection chamber may be defined in the housing and may be constructed and arranged to collect water separated from a fuel. A water level sensor may be positioned within the water collection chamber. The water level sensor may be constructed and arranged to detect a water level in the water collection chamber. The water level sensor may include an electrically conductive plastic first terminal.

17 Claims, 1 Drawing Sheet

(56) References Cited

U.S. PATENT DOCUMENTS

| | | | |
|---|---|---|---|
| 2004/0144963 A1* | 7/2004 | Braig | C08K 3/04 |
| | | | 252/500 |
| 2006/0196264 A1* | 9/2006 | Stahlmann | G01F 23/24 |
| | | | 73/304 R |
| 2010/0276352 A1 | 11/2010 | Mendel et al. | |
| 2010/0279352 A1 | 11/2010 | Ahmed et al. | |
| 2011/0102000 A1 | 5/2011 | Klett et al. | |
| 2011/0240475 A1* | 10/2011 | Hother | G01F 23/24 |
| | | | 204/674 |
| 2015/0021246 A1 | 1/2015 | Sturgess | |

FOREIGN PATENT DOCUMENTS

| | | |
|---|---|---|
| DE | 102012005206 A1 | 9/2013 |
| DE | 102013211209 A1 | 12/2014 |
| JP | 11304565 A | 11/1999 |
| JP | 2008-536037 A | 9/2008 |
| JP | 2012-511706 A | 5/2012 |
| JP | 2014-509255 A | 4/2014 |
| WO | WO-02/50498 | 6/2002 |
| WO | WO-2016057493 A1 | 4/2016 |

OTHER PUBLICATIONS

English abstract for DE-102008001100 Oct. 2009.
English translation of Korean Office Action for KR10-2017-7026373, dated May 14, 2018.
English translation of Korean Office Action for KR-10-2017-7026373, dated Dec. 11, 2017.

* cited by examiner

FUEL FILTER

CROSS-REFERENCE TO RELATED APPLICATIONS

This application claims priority to International Patent Application No. PCT/EP2016/054890, filed on Mar. 8, 2016, and German Patent Application No. DE 10 2015 205 065.3, filed on Mar. 20, 2015, the contents of each of which are incorporated herein by reference in their entirety.

TECHNICAL FIELD

The present invention relates to a fuel filter with a housing and a filter element arranged therein and with a water collection chamber for collecting the water separated from the fuel and with a water level sensor. The invention additionally relates to a water level sensor for a fuel filter of this type.

BACKGROUND

From DE 10 2012 005 206 A1 a generic fuel filter, in particular a diesel fuel filter, of an internal combustion engine and a heating sensor module are known. Here, a filter housing comprises at least one inlet for the fuel to be cleaned and at least one outlet for the clean fuel. In the interior of the filter housing, a filter element is arranged in such a manner that it separates the at least one inlet from the at least one outlet. Here, at least one heating element of the heating device is arranged in a heating chamber which is located outside the interior of the filter housing with respect to a fuel flow between the inlet and a raw side of the filter element and which is co-delimited with a module housing of the heating sensor module. This is intended to make possible building the fuel filter and also the heating sensor module as compact as possible and easily temperature-control the fuel at the same time.

For a generic fuel filter to perfectly function in the long term, the water separated in the water collection chamber has to be drained from time to time. The correct timing for this is determined by way of the water level sensor which up to now had two metal pins. However, in order to be able to completely isolate the metal pins from the fuel or from the water the metal pins were each insulated with a sealing ring. At the same time, the metal pins were coated for example with tin, silver or similar in order to be resistant to oxidation and thus creep insulation. However, the design known from the prior art in this case is not only elaborate but also expensive.

SUMMARY

The present invention therefore deals with the problem of stating an improved or at least an alternative embodiment for a fuel filter of the generic type which can be realised in particular more cost-effectively.

According to the invention, this problem is solved through the subject of the independent claim(s). Advantageous embodiments are subject of the dependent claims.

The present invention is based on the general idea of replacing at least one metal pin currently present in a water level sensor fuel filter with electrically conductive plastic. In the known manner, the fuel filter according to the invention has a housing and a filter element arranged therein, in particular a ring filter element, and a water collection chamber for collecting the water separated from the fuel. For detecting a water level in the water collection chamber, a water level sensor is provided on which at least one first terminal is formed from an electrically conductive plastic. By replacing the metal pin currently required for the first terminal, combined with the comparatively elaborate oxide coating and sealing of the same, a clearly more cost-effective solution can be realised through the water level sensor according to the invention with at least one first terminal of an electrically conductive plastic, which renders in particular the currently elaborate application of the oxidation protection layer obsolete.

With an advantageous further development of the solution according to the invention, the filter housing is at least partly formed from electrically conductive plastic and because of this forms a second electrically conductive terminal of the water level sensor. Thus, this constitutes the first embodiment of the fuel filter according to the invention, in the case of which the water level sensor itself has the first terminal of electrically conductive plastic whereas the second electrically conductive terminal required for the water level sensor is formed by the filter housing formed from electrically conductive plastic. Alternatively, the filter housing in this case can obviously also be formed from metal and by way of this form the electrically conductive second terminal. In an alternative embodiment of the solution according to the invention, a second terminal of an electrically conductive plastic is arranged on the water level sensor. Thus, this alternative provides both electrically conductive terminals on the water level sensor, wherein in this case both electrical terminals are formed from electrically conductive plastic. In order to be able to avoid a short circuit between the terminals in this case, an insulation layer, for example of an electrically non-conductive plastic is provided between these. For producing such a water level sensor or such a fuel filter, the water level sensor can be formed for example as a two-component plastic injection moulding, wherein a plastic component is formed to be electrically conductive, for example by admixing carbon fibres, and because of this forms the electrically conductive plastic for the two terminals, while the other plastic component is electrically non-conductive and separates, i.e. electrically isolates the two terminals from one another. The production of such a water level sensor is likewise possible comparatively easily and cost-effectively.

In a further alternative embodiment of the solution according to the invention, the second electrically conductive terminal of the water level sensor is formed as a metal pin on the water level sensor. In this case, the water level sensor according to the invention would continue to have a metal pin, which forms the second electrically conductive terminal, wherein however the first electrically conductive terminal is formed by electrically conductive plastic and thus compared with water level sensors known from the prior art at least one metal pin could be saved. In this case, the remaining metal pin is provided with an insulating layer against bypass leakage and overmoulded with the electrically conductive plastic.

Practically, the electrically conductive plastic is a fibre-reinforced thermoplastic with at least 8% by weight, preferentially 40% by weight of carbon fibres. By providing carbon fibres, the electrical conductivity can be improved. Alternatively, the addition of soot is also possible. The carbon fibres and/or the soot provided in the electrically conductive plastic do not only assume the function of the electrical conductivity but additionally stiffen the water level sensor. Alternatively, further components/additions can obviously also bring about the electrical conductivity of the plastic such as for example metal fibres, aluminium flakes etc. It is also conceivable that the plastic itself is electrically conductive without further addition such as for example poly-3-,4-ethylene dioxythiophene, polystyrene sulfonate, etc. Obviously, other fibres, in particular glass fibres can also be additionally provided as reinforcing elements, by way of which the water level sensor can be further stiffened.

In a further advantageous embodiment of the solution according to the invention, the electrically conductive plastic comprises a PA66 GF22 CF8 and thus is formed from polyamide 66 and 22% by weight of glass fibres and 8% by weight of carbon fibres. An alternative embodiment is formed by an electrically conductive plastic of PA66 CF40 and thus consists of polyamide 66 and 40% by weight of carbon fibres or is formed by an electrically conductive plastic of PA6 CF40 and thus consists of polyamide 6 and 40% by weight of carbon fibers.

The present invention, furthermore is based on the general idea of stating a water level sensor for a previously described fuel filter in the case of which a first and a second terminal of the water level sensor are formed from an electrically conductive plastic. Such a water level sensor formed according to the invention renders the previously required metal pins and their elaborate coating and sealing entirely obsolete, as a result of which the water level sensor according to the invention can be produced significantly more cost-effectively.

With an advantageous further development of the water level sensor according to the invention, the same can be formed as a two-component plastic injection moulding, wherein a plastic component is formed electrically conductive and because of this forms the two terminals while the second plastic component is electrically non-conductive and because of this electrically isolates the two terminals from one another. A water level sensor produced in this manner can again be produced cost-effectively yet highly effectively.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

Exemplary illustrations are described in detail by referring to the drawings as follows.

DETAILED DESCRIPTION

Figure 1:
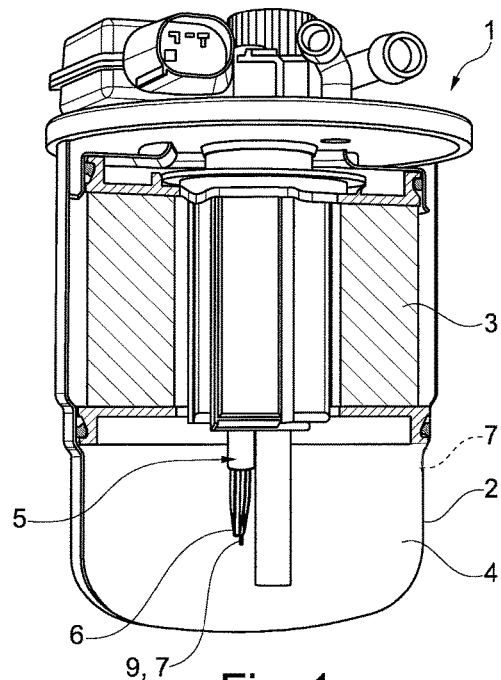
FIG. 1 illustrates a sectional representation through a fuel filter according to the invention.

According to FIG. 1, a fuel filter 1 according to the invention, which can be formed for example as a diesel fuel filter, comprises a housing 2 and a filter element 3 arranged therein. Below the filter element 3, which can be formed for example as a ring filter element, a water collection chamber 4 for collecting water separated from the fuel can be provided. In order to be able to detect a water level within the water collection chamber 4, a water level sensor 5 is provided. According to the invention, a first terminal 6 of an electrically conductive plastic is now formed on this water level sensor 5. For forming a second electrical terminal 7, different embodiments are conceivable here.

In a first alternative embodiment, the second terminal 7 can be arranged in the housing 2, wherein in this case the housing 2 is formed from metal or at least partly from an electrically conductive plastic. This case is represented in FIG. 1 with dashed reference character drawing line.

Figures 2, 3:
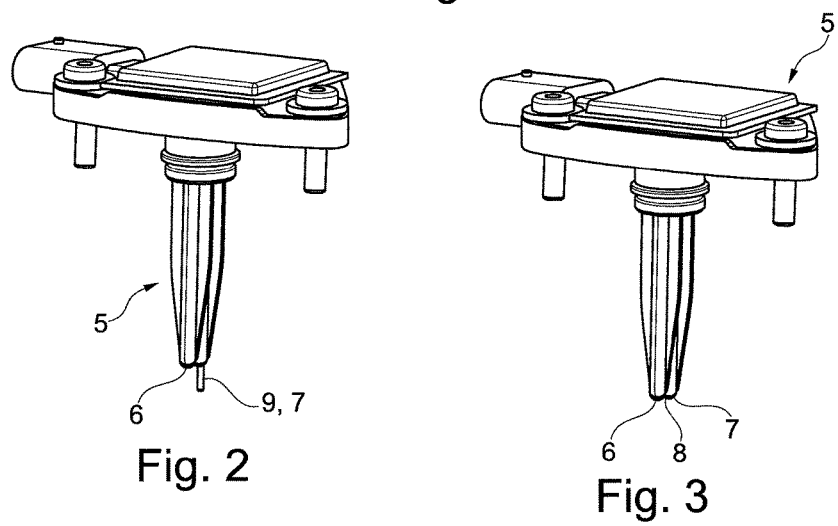
FIG. 2 illustrates a water level sensor according to the invention with a metallic pin and a terminal formed from an electrically conductive plastic.
FIG. 3 illustrates a representation as in FIG. 2, however with two terminals each formed from an electrically conductive plastic.

Alternatively to this, the second terminal 7 on the water level sensor 5 can likewise be formed from an electrically conductive plastic as is shown for example with the water level sensor 5 according to FIG. 3. In this case, the water level sensor 5 can be formed as a so-called two-component plastic injection moulding, wherein a first plastic component is electrically conductive and forms the two terminals 6, 7 of the water level sensor, whereas a second plastic component is electrically non-conductive and is arranged for example as substrate insulating plastic 8 between the two terminals 6, 7 isolating these electrically from one another.

Again alternatively to this it can also be provided that the second electrically conductive terminal 7 of the water level sensor 5 is formed as a metal pin 9 on the water level sensor 5, as is the case for example with the water level sensor 5 according to FIG. 2. This metal pin 9 is then preferentially overmoulded with an electrically conductive plastic or coated with an oxide layer, for example a silver or tin layer.

All alternative embodiments of the water level sensor 5 according to the invention and thus also of the fuel filter 1 according to the invention have in common that on the water level sensor 5 at least one of the two metal pins forming the two terminals 6, 7 provided there in the past can be omitted, as a result of which the water level sensor 5 according to the invention cannot only be produced significantly simpler but also substantially more cost-effectively.

As electrically conductive plastic, a fibre-reinforced thermoplastic with at least 8% by weight of carbon fibres can be employed for example. The carbon fibres in this case do not only bring about the electrical conductivity but additionally stiffen the water level sensor 5. Obviously, further stiffening fibres such as for example glass fibres can also be embedded as reinforcing element in the electrically conductive plastic. A particularly preferred electrically conductive plastic for use with the water level sensor 5 according to the invention is for example a PA6CF40 with polyamide 6, 40% by weight of carbon fibres. By way of a higher carbon fibre proportion and/or soot proportion, an improved surface conductivity can be established. Another solution can be pressing an electrical conductor into the plastic so that the plastic surface of matrix material is penetrated. Increasing the carbon fibre proportion up to 40% by weight increases the probability of uninterrupted conducting paths through the plastic substantially. This means that the conductivity increases (resistance decreases). A high conductivity is important for the function of the electronic circuit. The high fibre proportion of the plastic additionally guarantees excellent strength values. Thus, the material is suitable for plastic housings. At the same time, this plastic is outstandingly suitable for discharging ESD voltages, when used as housing material. In the contact with fuels and water in conjunction with direct current from the measurement electronics the material, in contrast with metals, reacts in an inert manner which likewise constitutes a substantial advantage.

Obviously, the water level sensor 5 according to the invention can also be offered separately from the fuel filter 1 for example as replacement and/or retrofit part.

Thus, with the water level sensor 5 according to the invention, at least one of the previously two required metal electrodes can be saved as a result of which a substantial cost saving can be achieved.

The invention claimed is:

1. A fuel filter comprising:
   a housing;
   a filter element positioned within the housing;
   a water collection chamber defined in the housing, constructed and arranged to collect water separated from a fuel;
   a water level sensor positioned within the water collection chamber and arranged to detect a water level in the water collection chamber; and
   a terminal composed of an electrically conductive plastic disposed on the water level sensor, wherein the electrically conductive plastic of the terminal is a fibre-reinforced thermoplastic with approximately 40% by weight of carbon fibres.

2. The fuel filter according to claim 1, wherein the housing is composed of at least one of a metal material and an electrically conductive plastic material, and wherein the housing defines a second electrically conductive terminal of the water level sensor.

3. The fuel filter according to claim 1, further comprising a second terminal composed of an electrically conductive plastic arranged on the water level sensor.

4. The fuel filter according to claim 3, wherein the water level sensor includes a first injection moulded plastic component and a second injection moulded plastic component, and wherein the first injection moulded plastic component is electrically conductive and defines the terminal and the second terminal, and the second injection moulded plastic component is an electrically non-conductive substrate/insulating plastic.

5. The fuel filter according to claim 1, further comprising a second terminal disposed on the water level sensor, wherein the second terminal is a metal pin.

6. The fuel filter according to claim 5, wherein the metal pin has an oxide layer disposed thereon and is overmoulded with an electrically conductive plastic.

7. The fuel filter according to claim 6, wherein the oxide layer is composed of a material including silver.

8. The fuel filter according to claim 6, wherein the oxide layer is composed of a material including tin.

9. The fuel filter according to claim 5, wherein the metal pin is overmolded with an electrically conductive plastic.

10. The fuel filter according to claim 1, wherein the fibre-reinforced thermoplastic includes glass fibres constructed and arranged to reinforce the terminal.

11. The fuel filter according to claim 1, wherein the fibre-reinforced thermoplastic is composed of polyamide 66.

12. The fuel filter according to claim 1, wherein the housing is at least partially composed of a metal material in a region of the water collection chamber and is constructed and arranged to provide a second terminal of the water level sensor.

13. The fuel filter according to claim 1, wherein the housing is at least partially composed of an electrically conductive plastic material in a region of the water collection chamber and is constructed and arranged to provide a second terminal of the water level sensor.

14. The fuel filter according to claim 1, wherein the fibre-reinforced plastic includes soot.

15. A fuel filter, comprising:
    a housing at least partially composed of an electrically conductive material;
    a filter element positioned within the housing, the filter element having an annular configuration and defining a center axis;
    a water collection chamber defined in the housing, constructed and arranged to collect water separated from a fuel;
    a water level sensor positioned within the water collection chamber for detecting a water level in the water collection chamber, the water level sensor including a substrate body extending in an axial direction of the center axis into the water collection chamber;
    a first terminal composed of an electrically conductive plastic disposed on the water level sensor at an axial end of the substrate body away from the filter element; and
    wherein the electrically conductive material of the housing defines a second terminal of the water level sensor, and wherein the electrically conductive material of the housing is a fibre-reinforced plastic with approximately 40% by weight of carbon fibres.

16. The fuel filter according to claim 15, wherein the electrically conductive plastic of the first terminal and is composed of polyamide 66 with 22% by weight of glass fibers and 8% by weight of carbon fibers.

17. A fuel filter, comprising:
    a housing;
    a filter element positioned within the housing;
    a water collection chamber defined in the housing, constructed and arranged to collect water separated from a fuel;
    a water level sensor disposed within the water collection chamber and arranged to detect a water level in the water collection chamber, the water level sensor including a first injection moulded plastic component and a second injection moulded plastic component;
    a first terminal disposed on the water level sensor;
    a second terminal disposed on the water level sensor;
    wherein the first injection moulded plastic component is composed of an electrically conductive plastic and defines the first terminal and the second terminal, and the second injection moulded plastic component is composed of an electrically non-conductive plastic, and wherein the first injection moulded plastic component is overmoulded with the second injection moulded plastic component and the electrically non-conductive plastic defines an electrically insulating substrate disposed between the first terminal and the second terminal; and
    wherein the electrically conductive plastic is a fibre-reinforced plastic with approximately 40% by weight of carbon fibres.

* * * * *